(12) United States Patent
Kim et al.

(10) Patent No.: US 12,265,990 B2
(45) Date of Patent: Apr. 1, 2025

(54) METHOD OF DETECTING BRAND THEFT AND AND APPARATUS FOR PERFORMING THE SAME

(71) Applicant: S2W INC., Seongnam-si (KR)

(72) Inventors: Ki Cheol Kim, Seongnam-si (KR); Dong Bin Seol, Suwon-si (KR); Keun Tae Park, Seoul (KR)

(73) Assignee: S2W INC., Seongnam-si (KR)

(*) Notice: Subject to any disclaimer, the term of this patent is extended or adjusted under 35 U.S.C. 154(b) by 0 days.

(21) Appl. No.: 18/540,268

(22) Filed: Dec. 14, 2023

(65) Prior Publication Data

US 2024/0273571 A1 Aug. 15, 2024

(30) Foreign Application Priority Data

Dec. 30, 2022 (KR) .......... 10-2022-0190080

(51) Int. Cl.
*G06Q 30/02* (2023.01)
*G06F 16/951* (2019.01)
(Continued)

(52) U.S. Cl.
CPC ....... *G06Q 30/0248* (2013.01); *G06F 16/951* (2019.01); *G06V 30/10* (2022.01)

(58) Field of Classification Search
CPC ........... G06Q 30/0248; G06Q 30/0185; G06Q 50/184; G06F 16/951; G06F 16/53;
(Continued)

(56) References Cited

U.S. PATENT DOCUMENTS

| 2005/0210009 A1* | 9/2005 | Tran ................. H04L 63/08 |
| 2008/0008348 A1* | 1/2008 | Metois ............... G06V 30/18 382/100 |
| 2009/0157675 A1* | 6/2009 | Stellhorn ........... G06Q 10/107 |

FOREIGN PATENT DOCUMENTS

| KR | 10-1162318 B1 | 8/2012 |
| KR | 10-2019-0042984 A | 4/2019 |

(Continued)

OTHER PUBLICATIONS

University of Chicago, "Developing Your Brand Protection Tookit" (Year: 2021).*

(Continued)

*Primary Examiner* — Breffni Baggot
(74) *Attorney, Agent, or Firm* — Sughrue Mion, PLLC

(57) ABSTRACT

A method of detecting a brand theft according to an embodiment of the present disclosure includes: acquiring protected object data related to a brand to be protected, the protected object data including brand character data and brand logo image data related to a brand, and CDN keyword data indicating a source in which the brand logo image data is stored; acquiring crawled data by crawling an e-commerce web page; parsing the crawled data to acquire first data corresponding to a title or content of the web page, second data corresponding to an image, and third data related to a source of the image; analyzing each of the first data, the second data, and the third data to detect whether the protected object data is included in the crawled data for the web page; and monitoring e-commerce websites based on the detection result.

9 Claims, 10 Drawing Sheets

(51) Int. Cl.
*G06Q 30/0241* (2023.01)
*G06V 30/10* (2022.01)

(58) Field of Classification Search
CPC .... G06F 16/55; G06F 16/9535; G06F 16/958; G06F 40/221; G06V 30/10; G06V 10/764; G06V 30/41
See application file for complete search history.

(56) References Cited

FOREIGN PATENT DOCUMENTS

KR   10-2022-0018254 A   2/2022
KR   10-2022-0090262 A   6/2022

OTHER PUBLICATIONS

Korean Office Action dated Sep. 30, 2024 in Application No. 10-2022-0190080.

\* cited by examiner

METHOD OF DETECTING BRAND THEFT AND AND APPARATUS FOR PERFORMING THE SAME

CROSS-REFERENCE TO RELATED APPLICATION

This application claims priority to and the benefit of Korean Patent Application No. 2022-0190080, filed on Dec. 30, 2022, the disclosure of which is incorporated herein by reference in its entirety.

BACKGROUND

1. Field of the Invention

The present disclosure relates to technology for detecting a brand theft. More particularly, the present disclosure relates to technology for detecting a brand theft on e-commerce websites. Furthermore, the present disclosure relates to technology for monitoring websites on which a brand theft has been detected.

2. Discussion of Related Art

As e-commerce becomes more active, the problem of selling products by stealing other brands' intellectual property rights on e-commerce platforms is emerging.

Conventionally, the brand theft problem has been handled by original authors or administrators requesting e-commerce platform operators to stop posting brand theft products, and by the e-commerce platform operators to manually stop posting the brand theft products. However, there was a problem that manually detecting stolen brands on numerous e-commerce platforms and manually supervising whether to perform takedown management and implementation of stolen products are time-consuming and costly. Furthermore, as brand theft techniques become more sophisticated to avoid brand theft detection, there are limitations in manually detecting a brand theft as in the conventional method.

Accordingly, there is a need to develop a method of detecting a brand theft and an apparatus for performing the same to efficiently detect and manage a brand theft in e-commerce.

SUMMARY OF THE INVENTION

The present disclosure is directed to providing a method of detecting a brand theft in e-commerce and an electronic device for performing the same.

The present disclosure is also directed to providing a method of detecting a brand theft for monitoring a website related to the brand theft and an electronic device for performing the same.

The technical problems to be solved by the present disclosure are not limited to the above-described technical problems, and technical problems that are not mentioned will be clearly understood by those skilled in the art to which the present disclosure pertains from the present specification and the accompanying drawings.

According to an aspect of the present disclosure, there is provided a method of detecting a brand theft, including: acquiring protected object data related to a brand to be protected, the protected object data including brand character data and brand logo image data related to the brand, and content delivery network (CDN) keyword data indicating a source in which the brand logo image data is stored; acquiring crawled data by crawling an e-commerce web page; parsing the crawled data to acquire first data corresponding to a title or content of the web page, second data corresponding to an image, and third data related to a source of the image; analyzing each of the first data, the second data, and the third data and detecting whether the protected object data is included in the crawled data for the web page; and monitoring e-commerce websites based on a result of the detection.

According to another aspect of the present invention, there is provided an electronic device, including: a processor configured to acquire protected object data related to a brand to be protected, the protected object data including brand character data and brand logo image data related to the brand, and CDN keyword data indicating a source in which the brand logo image data is stored, crawl an e-commerce web page to acquire crawled data, parse the crawled data to acquire first data corresponding to a title or content of the web page, second data corresponding to an image, and third data related to a source of the image, analyze each of the first data, the second data, and the third data to detect whether the protected object data is included in the crawled data for the web page, and monitor e-commerce websites based on a result of the detection.

Technical solutions of the present disclosure are not limited to the above mentioned technical solutions, and technical solutions that are not mentioned will be clearly understood by those skilled in the art to which the present disclosure pertains from the present specification and the accompanying drawings.

BRIEF DESCRIPTION OF THE DRAWINGS

The above and other aspects of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
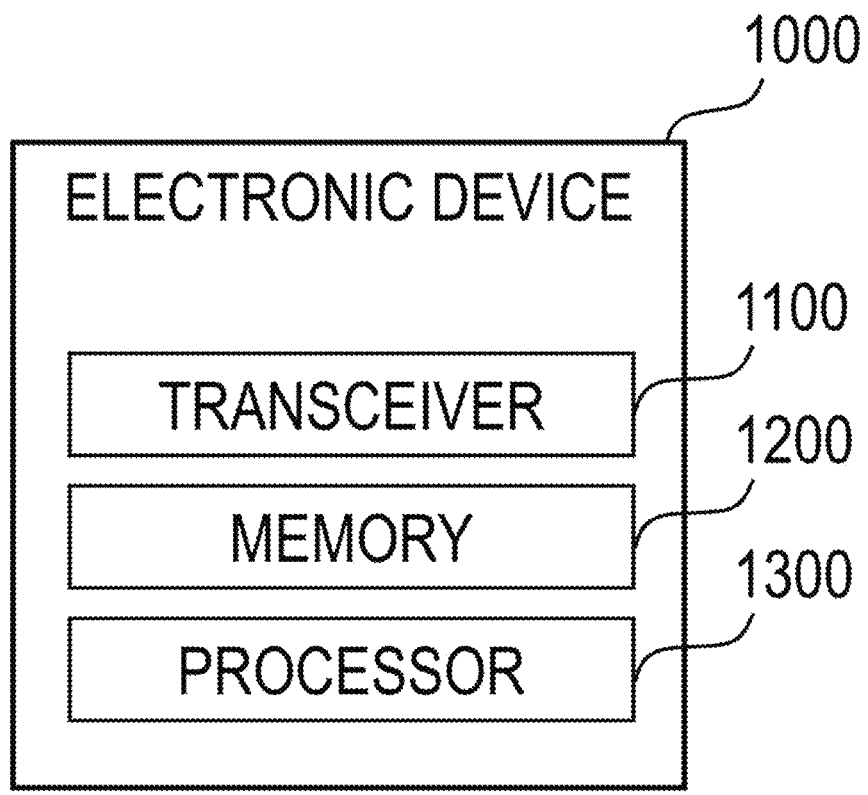
FIG. 1 is a schematic diagram of an electronic device according to an embodiment of the present disclosure.

Objects, features, and advantages of the present disclosure will become more obvious from the following detailed description provided in relation to the accompanying drawings. However, the present disclosure may be variously modified and have several embodiments. Hereinafter, specific embodiments of the present disclosure will be illustrated in the accompanying drawings and be described in detail.

In principle, same reference numerals denote same constituent elements throughout the specification. Further, elements having the same function within the scope of the same idea illustrated in the drawings of each embodiment will be described using the same reference numerals, and overlapping descriptions thereof will be omitted.

When it is determined that a detailed description for the known functions or configurations related to the present disclosure may obscure the gist of the present disclosure, detailed descriptions thereof will be omitted. In addition, numbers (for example, first, second, etc.) used in the description process of the present specification are only identification symbols for distinguishing one component from other components.

In addition, the terms "module" and "unit" for components used in the following embodiments are used only in order to easily make the disclosure. Therefore, these terms do not have meanings or roles that distinguish from each other in themselves.

In the following embodiments, singular forms include plural forms unless interpreted otherwise in context.

In the following embodiments, the term "include," "have," or the like means that a feature or element described in the specification is present, and it does not preclude in advance the possibility that one or more other features or components may be added.

Sizes of components may be exaggerated or reduced in the accompanying drawings for convenience of explanation. For example, the size and thickness of each component illustrated in the drawings are arbitrarily indicated for convenience of description, and the present disclosure is not necessarily limited to those illustrated.

In a case where certain embodiments can be otherwise implemented, the order of specific processes may be performed different from the order in which the processes are described. For example, two processes described in succession may be performed substantially simultaneously, or may be performed in an order opposite to the order described.

In the following embodiments, when components are connected, it includes not only a case where components are directly connected but also a case where components are indirectly connected via certain component interposed between the components.

For example, in the present specification, when components and the like are electrically connected, it includes not only a case where components are directly electrically connected, but also a case where components are indirectly electrically connected via a certain component interposed between the components.

A method of detecting a brand theft according to an embodiment of the present disclosure may include: acquiring protected object data related to a brand to be protected, the protected object data including brand character data and brand logo image data related to the brand, and content delivery network (CDN) keyword data indicating a source in which the brand logo image data is stored; acquiring crawled data by crawling an e-commerce web page; parsing the crawled data to acquire first data corresponding to a title or content of the web page, second data corresponding to an image, and third data related to a source of the image; analyzing each of the first data, the second data, and the third data to detect whether the protected object data is included in the crawled data for the web page; and monitoring e-commerce websites based on a detection result.

According to an embodiment of the present disclosure, the detecting of whether the protected object data is included in the crawled data for the web page may further include: determining whether the first data includes a character corresponding to the brand character data of the protected object data; determining whether character information included in the image included in the second data corresponds to the brand character data of the protected object data; determining whether an image included in the second data corresponds to the brand logo image data of the protected object data; and comparing the third data with CDN keyword data of the protected object data to determine whether the third data includes a character corresponding to the CDN keyword data of the protected object data.

According to an embodiment of the present disclosure, the determining of whether the first data includes the characters corresponding to the brand character data of the protected object data may further includes: primarily classifying the first data including the characters corresponding to the brand character data of the protected object data through keyword matching between the first data and the brand character data of the protected object data; and secondarily classifying whether the classified first data includes the characters corresponding to the brand character data of the protected object data from the classified first data through a trained filtering model.

According to an embodiment of the present disclosure, the determining of whether the character information included in the image included in the second data corresponds to the brand character data of the protected object data may further include: acquiring the character information included in the image from the image included in the second data through a trained optical character recognition (OCR) model; calculating a probability that the character information corresponds to brand character data of the protected object data through a trained OCR model; and determining whether the character information corresponds to the brand character data of the protected object data based on the calculated probability.

According to an embodiment of the present disclosure, the determining whether the image included in the second data corresponds to the brand logo image data of the protected object data may further include: detecting an area corresponding to the image included in the second data through a trained object detection and classification model; classifying whether an image corresponding to the detected area corresponds to the brand logo image data of the protected object data through the trained object detection and classification model; and determining whether the image included in the second data corresponds to the brand logo image data of the protected object data based on the classification result.

According to an embodiment of the present disclosure, the monitoring of the e-commerce websites based on the detection result may further include: generating an abusing code related to a stolen brand name or legal action using the detection result, based on a predetermined rule; and generating a report by generating the generated abusing code.

According to an embodiment of the present disclosure, the monitoring of the e-commerce websites based on the detection result may further include: acquiring a candidates list including web pages that need to be managed in relation to the brand theft based on the detection result; and monitoring the candidates list based on a takedown process.

According to an embodiment of the present disclosure, the takedown process may determine whether there is a takedown request for the web page when the web page included in the candidates list is accessible, determine that the takedown succeeds when there is a takedown request to exclude the web page from the candidates list, and maintain the web page in the candidates list when there is no takedown request.

According to an embodiment of the present disclosure, when the web page included in the candidates list is not accessed, the takedown process may determine whether the web page is accessible for a predetermined period of time from the time when the access is not made, and when the web page is not accessed for the predetermined period of time, the takedown process may determine that the takedown of the web page succeeds to exclude the web page from the candidates list.

According to an embodiment of the present disclosure, a computer-readable recording medium on which a program for executing the method of detecting a brand theft is recorded.

According to an embodiment of the present disclosure, an electronic device for detecting a brand theft may include: a processor configured to acquire protected object data related to a brand to be protected, the protected object data including brand character data and brand logo image data related to a brand, and CDN keyword data indicating a source in which the brand logo image data is stored, crawl an e-commerce web page to acquire crawled data, parse the crawled data to acquire first data corresponding to a title or content of the web page, second data corresponding to an image, and third data related to a source of the image, analyze each of the first data, the second data, and the third data to detect whether the protected object data is included in the crawled data for the web page, and monitor e-commerce websites based on the detection result.

Hereinafter, referring to FIGS. 1 to 10, a method of detecting a brand theft and an electronic device (or server, hereinafter referred to as an electronic device) for performing the method according to an embodiment of the present disclosure will be described.

FIG. 1 is a schematic diagram of an electronic device 1000 according to an embodiment of the present disclosure.

The electronic device 1000 according to the embodiment of the present disclosure may include a transceiver 1100, a memory 1200, and a processor 1300.

The transceiver 1100 of the electronic device 1000 may communicate with an arbitrary external device or an external server. As an example, the electronic device 1000 may receive any protected object data (e.g., brand character data, brand logo image data, and/or data related to a source in which the brand logo image data is stored) related to a brand to be protected from the external server through the transceiver 1100. As an example, the electronic device 1000 may receive crawled data obtained by crawling an e-commerce website through the transceiver 1100. As an example, the electronic device 1000 may transmit brand theft detection results for each website to any external device or the external server through the transceiver 1100.

The electronic device 1000 may access a network through the transceiver 1100 to transmit and receive various types of data. The transceiver 1100 may largely include a wired type and a wireless type. Since the wired type and the wireless type have their respective strengths and weaknesses, in some cases, the wired type and the wireless type may be simultaneously provided in the electronic device 1000. Here, in the case of the wireless type, a wireless local area network (WLAN)-based communication method such as Wi-Fi may be mainly used. Alternatively, in the case of the wireless type, cellular communication, for example, a long term evolution (LTE) and 5G-based communication method may be used. However, the wireless communication protocol is not limited to the above-described example, and any suitable wireless type communication method may be used. In the case of the wired type, local area network (LAN) or universal serial bus (USB) communication is a representative example, and other methods are also possible.

The memory 1200 of the electronic device 1000 may store various types of information. Various types of data may be temporarily or semi-permanently stored in the memory 1200. An example of the memory 1200 may include a hard disk drive (HDD), a solid state drive (SSD), a flash memory, a read-only memory (ROM), a random access memory (RAM), or the like. The memory 1200 may be provided in a form embedded in the electronic device 1000 or in a detachable form. The memory 1200 may store various types of data necessary for the operation of the electronic device 1000 in addition to an operating system (OS) for driving the electronic device 1000 or a program for operating each component of the electronic device 1000.

The processor 1300 may control a general operation of the electronic device 1000. For example, the processor 1300 may control the overall operation of the electronic device 1000 by including an operation of acquiring protected object data related to a brand to be protected, which will be described later, an operation of acquiring crawled data by crawling e-commerce websites, an operation of parsing the crawled data to extract standardized data, an operation of analyzing the extracted data to detect whether the protected object data is included in the crawled data, and/or an operation of monitoring e-commerce websites based on the detection result. Specifically, the processor 1300 may load and execute a program for the overall operation of the electronic device 1000 from the memory 1200. The processor 1300 may be implemented as an application processor (AP), a central processing unit (CPU), a microcontroller unit (MCU), or similar devices thereto according to hardware, software, or a combination thereof. In this case, the processor 1300 may be provided in an electronic circuit form processing an electrical signal to perform a control function in terms of hardware, and may be provided in a program or code form driving the hardware circuit in terms of software.

Figure 2:
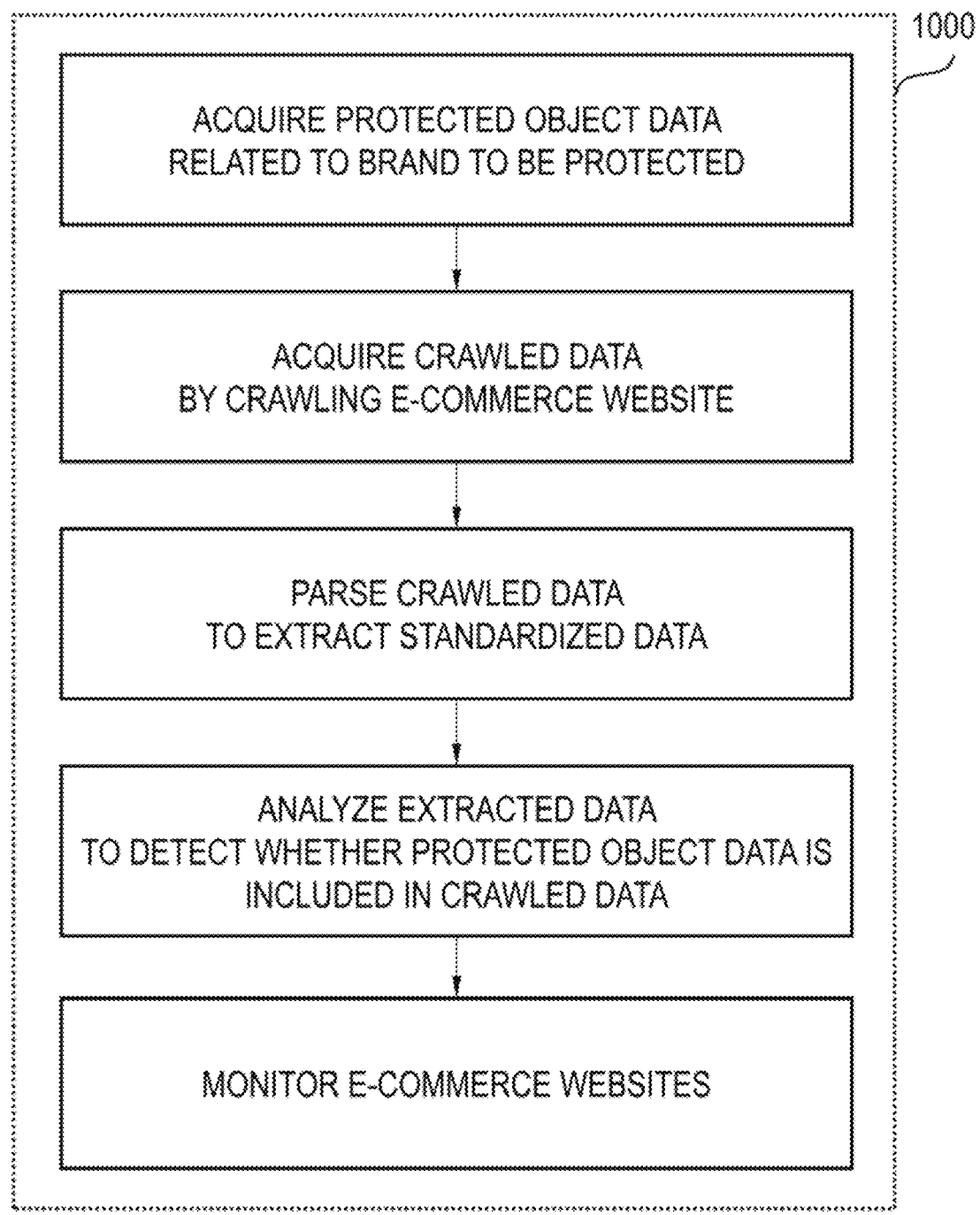
FIG. 2 is a diagram illustrating an operation of an electronic device according to an embodiment of the present disclosure.

FIG. 2 is a diagram illustrating an operation of the electronic device 1000 according to the embodiment of the present disclosure.

The electronic device 1000 according to the embodiment of the present disclosure may acquire the protected object data related to the brand to be protected through the transceiver 1100. Here, the protected object data may refer to encompassing data in any form (e.g., character form and/or image form) related to a brand to be protected, including character data (hereinafter, brand character data) representing a brand, image data (hereinafter, brand logo image data) related to a brand logo, and/or data (e.g., CDN keyword data) related to a source in which the brand logo image data is stored.

The electronic device 1000 according to the embodiment of the present disclosure may acquire crawled data by crawling the e-commerce website through the transceiver 1100. For example, the electronic device 1000 may crawl e-commerce websites using crawling technique (e.g., a crawling tool such as Selenium or Scrapy) and acquire crawled data according to crawling results. Meanwhile, the electronic device 1000 may be implemented to acquire crawled data of e-commerce web pages every certain cycle.

The electronic device 1000 according to the embodiment of the present disclosure may parse the crawled data to extract the standardized data. For example, the electronic device 1000 may parse the crawled data to acquire first data corresponding to a title or content of a web page. For example, the electronic device 1000 may parse the crawled data to acquire second data corresponding to an image of a web page. For example, the electronic device 1000 may parse the crawled data to acquire third data related to a source of an image.

The electronic device 1000 according to the embodiment of the present disclosure may perform an operation of analyzing data extracted through the parsing to detect whether the protected object data is included in the crawled data. As an example, the electronic device 1000 may determine whether the first data corresponding to the title or content of the web page includes the characters corresponding to the brand character data of the protected object data. As an example, the electronic device 1000 may determine whether character information included in an image included in the second data of the web page corresponds to the brand character data of the protected object data. As an example, the electronic device 1000 may determine whether the image included in the second data of the web page corresponds to the brand logo image data of the protected object data. As an example, the electronic device 1000 may compare the third data related to the source of the image of the web page and CDN keyword data of the protected object data to determine whether characters corresponding to the CDN keyword data of the protected object data are included in the third data.

The details of detecting whether the protected object data is included in the crawled data will be described in more detail with reference to FIGS. 4 to 7.

The electronic device 1000 according to the embodiment of the present disclosure may perform an operation of monitoring the e-commerce websites based on the detection result. As an example, the electronic device 1000 may perform an operation of generating an abusing code related to a stolen brand name or legal action using the detection result based on the predetermined rule, and generating a report based on the generated abusing code. As an example, the electronic device 1000 may perform an operation of acquiring a candidates list including web pages that need to be managed in relation to brand theft based on the detection result, and monitoring the candidates list based on a takedown process.

The details of monitoring the e-commerce websites based on the detection result will be described in more detail with reference to FIGS. 8 to 10.

Hereinafter, the operation of the electronic device 1000 and the method of detecting a brand theft and/or monitoring a website executed by the electronic device 1000 according to the embodiment of the present disclosure will be described in detail with reference to FIGS. 3 to 10. Meanwhile, when describing the method of detecting a brand theft, some embodiments that overlap with the contents previously described with reference to FIG. 2 may be omitted. However, this is only for convenience of description and should not be construed as being limited thereto.

Figure 3:
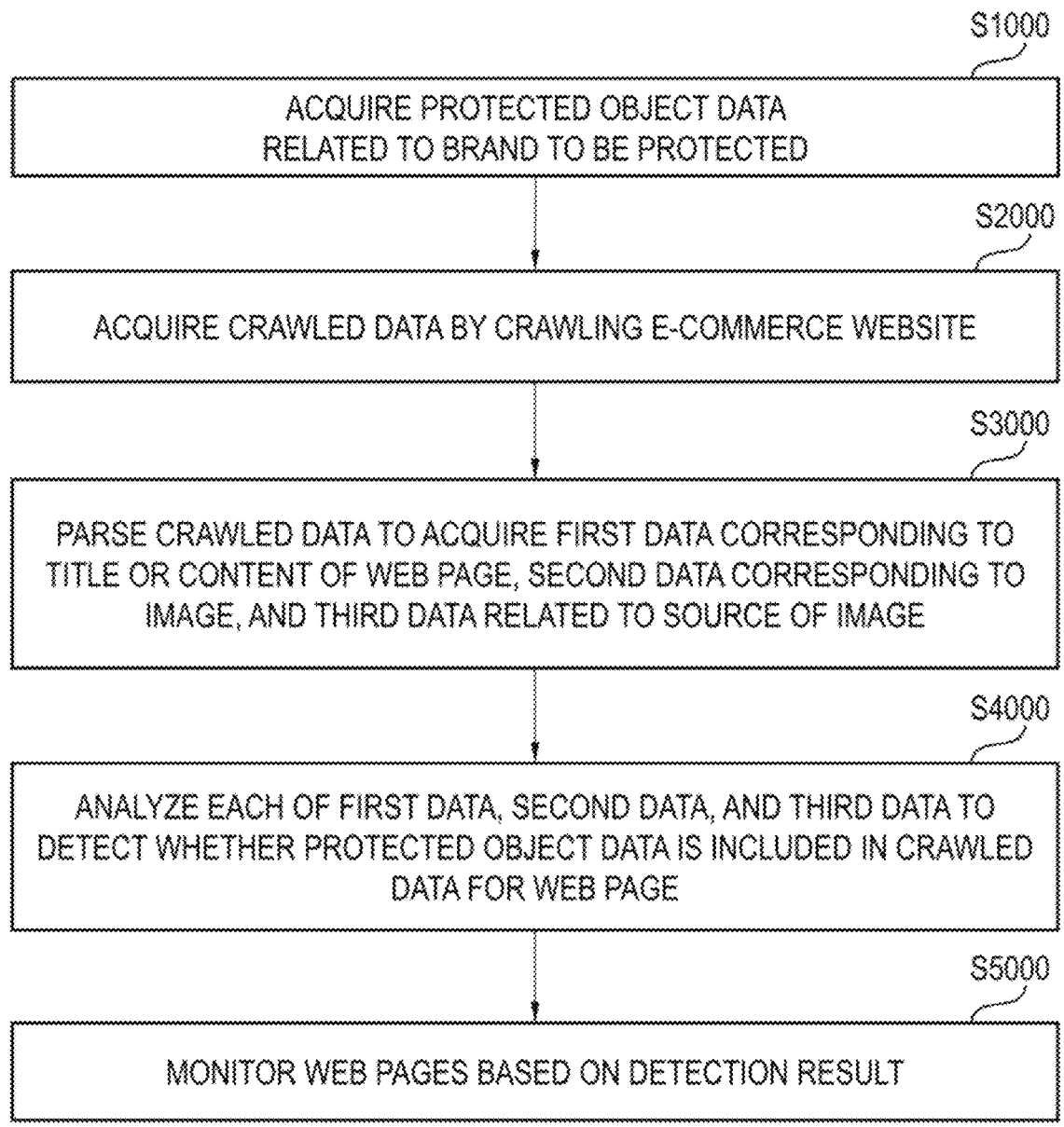
FIG. 3 is a flowchart illustrating a method of detecting a brand theft according to an embodiment of the present disclosure.

FIG. 3 is a flowchart illustrating a method of detecting a brand theft according to an embodiment of the present disclosure.

The method of detecting a brand theft according to the embodiment of the present disclosure may include an operation S1000 of acquiring protected object data related to a brand to be protected, an operation S2000 of acquiring crawled data by crawling an e-commerce website, an operation S3000 of parsing the crawled data to acquire first data corresponding to titles or content of a web page, second data corresponding to an image, and third data related to a source of the image, an operation S4000 of analyzing each of the first data, the second data, and the third data to detect whether the protected object data is included in the crawled data for the web page, and/or an operation S5000 of monitoring web pages based on the detection result.

In the operation S1000 of acquiring the protected object data related to the brand to be protected, the electronic device 1000 may acquire the protected object data related to the brand to be protected through the transceiver 1100. Here, the protected object data may refer to encompassing data in any form (e.g., character form and/or image form) related to a brand to be protected, including character data (hereinafter, brand character data) representing a brand, image data (hereinafter, brand logo image data) related to a brand logo, and/or data (e.g., CDN keyword data) related to a source in which the brand logo image data is stored.

In the operation S2000 of acquiring the crawled data by crawling the e-commerce website, the electronic device 1000 may acquire the crawled data by crawling the e-commerce website through the transceiver 1100. For example, the electronic device 1000 may crawl e-commerce websites using a crawling technique and acquire crawled data according to crawling results.

In the operation S3000 of parsing the crawled data to acquire the first data corresponding to the title or content of the web page, the second data corresponding to the image, and the third data related to the source of the image, the electronic device 1000 may parse the crawled data to extract the standardized data from the crawled data. For example, the electronic device 1000 may parse the crawled data to acquire the first data corresponding to the title or content of the web page. For example, the electronic device 1000 may parse the crawled data to acquire the second data corresponding to the image of the web page. For example, the electronic device 1000 may parse the crawled data to acquire the third data related to the source of the image.

In the operation S4000 of analyzing each of the first data, the second data, and the third data to detect whether the protected object data is included in the crawled data for the web page, the electronic device 1000 may analyze each of the first data, second data, and third data acquired through the operation S3000 to detect whether the protected object data is included in the crawled data for the web page (e.g., brand character data, brand logo image data, and/or CDN keyword data).

As an example, the electronic device 1000 may determine whether the first data corresponding to the title or content of the web page includes the characters corresponding to the brand character data of the protected object data. As an example, the electronic device 1000 may determine whether the character information included in the image included in the second data of the web page corresponds to the brand character data of the protected object data. As an example, the electronic device 1000 may determine whether the image included in the second data of the web page corresponds to the brand logo image data of the protected object data. As an example, the electronic device 1000 may compare the third data related to the source of the image of the web page and CDN keyword data of the protected object data to determine whether characters corresponding to the CDN keyword data of the protected object data are included in the third data.

In the operation S5000 of monitoring the web pages based on the detection result, the electronic device 1000 may monitor the e-commerce websites based on the detection result calculated through the operation S4000.

As an example, the electronic device 1000 may perform the operation of generating the abusing code related to the stolen brand information (e.g., brand name) or legal action using the detection result based on the predetermined rule, and generating the report based on the generated abusing code.

As an example, the electronic device 1000 may perform the operation of acquiring the candidates list including the web pages that need to be managed in relation to the brand theft based on the detection result, and monitoring the candidates list based on the takedown process.

Hereinafter, the method of detecting a brand theft according to the embodiment of the present disclosure will be described in more detail with reference to FIGS. 4 and 5.

Figure 4:
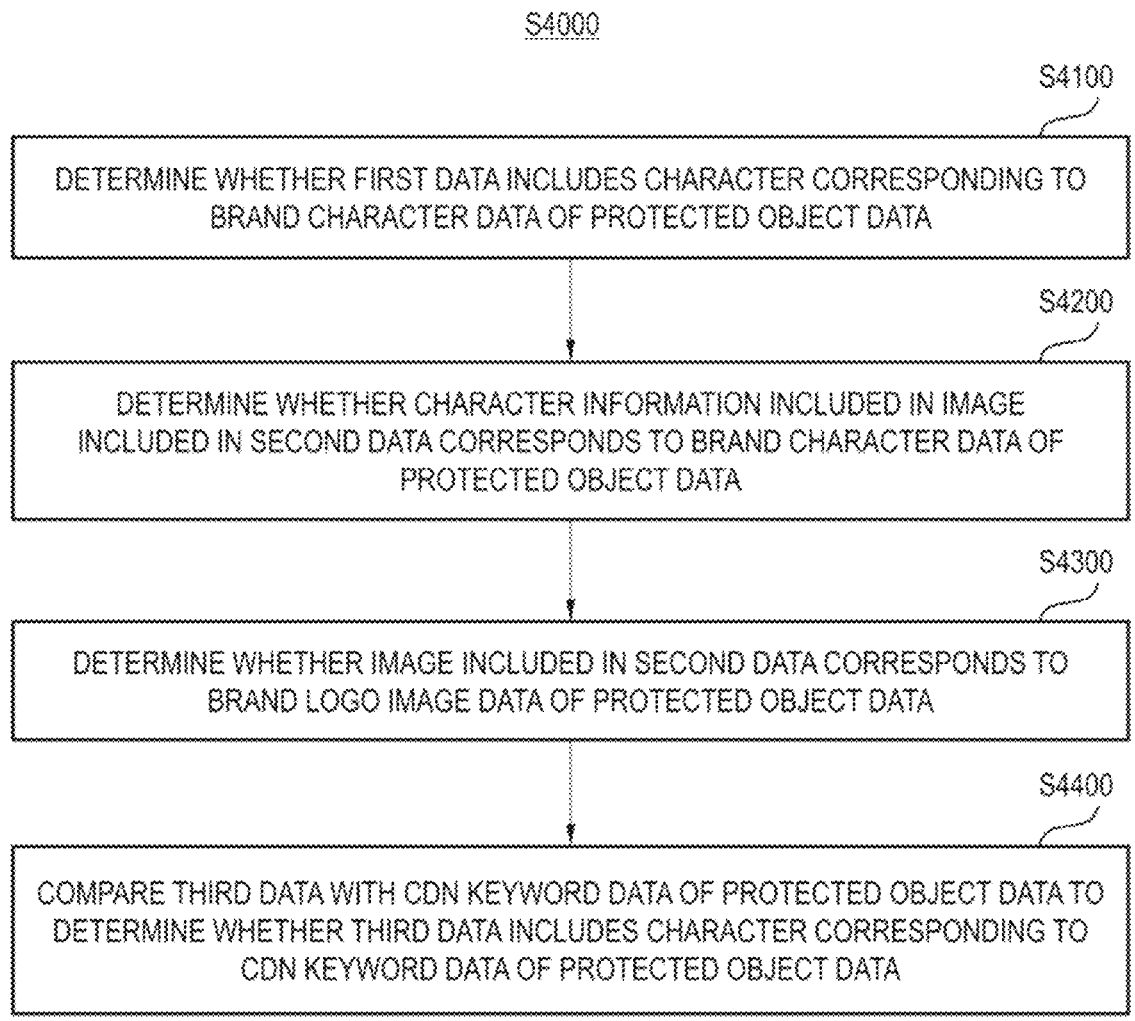
FIG. 4 is a flowchart specifying an operation of detecting whether protected object data is included in crawled data according to an embodiment of the present disclosure.

FIG. 4 is a flowchart specifying the operation S4000 of detecting whether the protected object data is included in the crawled data according to the embodiment of the present disclosure. FIG. 5 is a diagram illustrating an aspect of detecting whether the protected object data is included in the crawled data according to an embodiment of the present disclosure.

According to an embodiment of the present disclosure, the detecting of whether the protected object data is included in the crawled data for the web page may further include: an operation S4100 of determining whether the first data includes a character corresponding to the brand character data of the protected object data; an operation S4200 of determining whether character information included in the image included in the second data corresponds to the brand character data of the protected object data; an operation S4300 of determining whether an image included in the second data corresponds to the brand logo image data of the protected object data; and/or an operation S4400 of comparing the third data with CDN keyword data of the protected object data to determine whether the third data includes a character corresponding to the CDN keyword data of the protected object data.

In the operation S4100 of determining whether the first data includes the characters corresponding to the brand character data of the protected object data, the electronic device 1000 may perform an operation of primarily classifying the first data including the characters corresponding to the brand character data of the protected object data through keyword matching between the first data and the brand character data of the protected object data. For example, the first data including the character (i.e., "exploration") corresponding to the brand character data ("exploration") of the protected object data may be primarily classified through the keyword matching between the first data and the brand character data (e.g., assumed to be "exploration") of the protected object data.

Meanwhile, the first data that is primarily classified may include true positive data (e.g., "20 500 ml exploration sparkling plain carbonated water") including brand character data and simply literally corresponding false positive data (e.g., "dowsing rod, dowsing probe, exploration rod, and water vein wave measuring instrument").

Therefore, in the operation S4100 of determining whether the first data includes the characters corresponding to the brand character data of the protected object data, the electronic device 1000 may perform the operation of secondarily classifying whether the first data classified includes the characters corresponding to the brand character data of the protected object data through a trained filtering model. For example, the electronic device 1000 may classify the true positive data (e.g., "20 500 ml exploration sparkling plain carbonated water") included in the classified first data as a true positive value through the trained filtering model, and classify the false positive data (e.g., "dowsing rod, dowsing probe, exploration rod, and water vein wave measuring instrument") included in the classified data as a false positive value. In this case, the electronic device 1000 may determine whether the first data primarily classified includes the characters corresponding to the brand character data of the protected object data based on the classified true positive value and/or the classified false positive value.

Meanwhile, the filtering model may be trained based on a training data set including first training data assigned to a first label (e.g., true positive label) and second training data assigned to a second label (e.g., false positive label). Specifically, the filtering model may be trained by updating a parameter included in the filtering model based on a predicted value and a label output based on the training data set. As an example, the filtering model outputs the predicted value based on the first training data (e.g., true positive data), but may be trained by updating the parameter included in the filtering model so that the predicted value is approximated a first classification value corresponding to the first label (e.g., true positive label) and output. As an example, the filtering model outputs the predicted value based on the second training data (e.g., false positive data), but may be trained by updating the parameter included in the filtering model so that the predicted value is approximated to a second classification value corresponding to the second label (e.g., false positive label) and output. The trained filtering model may be configured to classify the true positive data corresponding to the first training data as the first classification value (e.g., true positive value), and classify the false positive data corresponding to the second training data as the second classification value (e.g., false positive value).

In the operation S4200 of determining whether the character information included in the image included in the second data corresponds to the brand character data of the protected object data, the electronic device 1000 may acquire the character information included in the image from the image included in the second data through a trained OCR model. Furthermore, the electronic device 1000 may calculate the probability that the acquired character information corresponds to the brand character data of the protected object data through the trained OCR model. Furthermore, the electronic device 1000 may determine whether the character information corresponds to the brand character data of the protected object data based on the calculated probability.

Meanwhile, the trained OCR model according to the embodiment of the present disclosure may be acquired by tuning a pre-trained OCR model (e.g., EasyOCR model, MMOCR model, etc.) using the training data for the protected object data. Specifically, the pre-trained OCR model may not recognize or misclassify some characters related to the protected object data (i.e., data about a specific brand). Therefore, according to the embodiment of the present disclosure, the electronic device 1000 may acquire training data for the brand logo image data and the brand character data of the protected object data, and acquire the trained OCR model with increased recognition performance for the brand character data of the protected object data by tuning the pre-trained OCR model using the acquired learning data. More specifically, the electronic device 1000 may tune the pre-trained OCR model by using the training data that includes the brand logo image data and labels assigned to the brand character data included in the brand logo image to update the parameter of the OCR model so that the OCR model output a value corresponding to the label from the brand character data included in the brand logo image.

In the operation S4300 of determining whether the image included in the second data corresponds to the brand logo image data of the protected object data, the electronic device 1000 determines an area corresponding to the image included in the second data through a trained object detection and classification model. Furthermore, the electronic device 1000 may classify whether the image corresponding to the detected area corresponds to the brand logo image data of the protected object data through the trained object detection and classification model. Furthermore, the electronic device 1000 may determine whether the image included in the second data corresponds to the brand image data of the protected object data based on the classification result. For example, when the probability that the image corresponding to the detected area corresponds to the brand logo image data of the protected object data is greater than or equal to a predetermined probability, the electronic device 1000 may be configured to determine that the image included in the second data corresponds to the brand logo image data of the protected object data. For example, when the probability that the image corresponding to the detected area corresponds to the brand logo image data of the protected object data is smaller than the predetermined probability, the electronic device 1000 may be configured to determine that the image included in the second data does not correspond to the brand logo image data of the protected object data.

Meanwhile, the trained object detection and classification model may be by tuning a pre-trained object detection and classification model (e.g., Detr model, YOLO model, DINO model, etc.) to be specialized for detection and classification tasks of the brand logo image. Specifically, the pre-trained object detection and classification model may be trained to classify the area corresponding to the brand logo image as "other." In this case, the electronic device 1000 may additionally train the pre-trained object detection and classification model using the training data that includes the brand logo image data of the protected object data and the label information (i.e., a label indicating that it is the brand logo image) assigned to the brand logo image data. More specifically, the electronic device 1000 may update the parameter of the pre-trained object detection and classification model so that the object detection and classification model outputs a value corresponding to a category corresponding to the label information from the brand logo image data.

Figure 5:
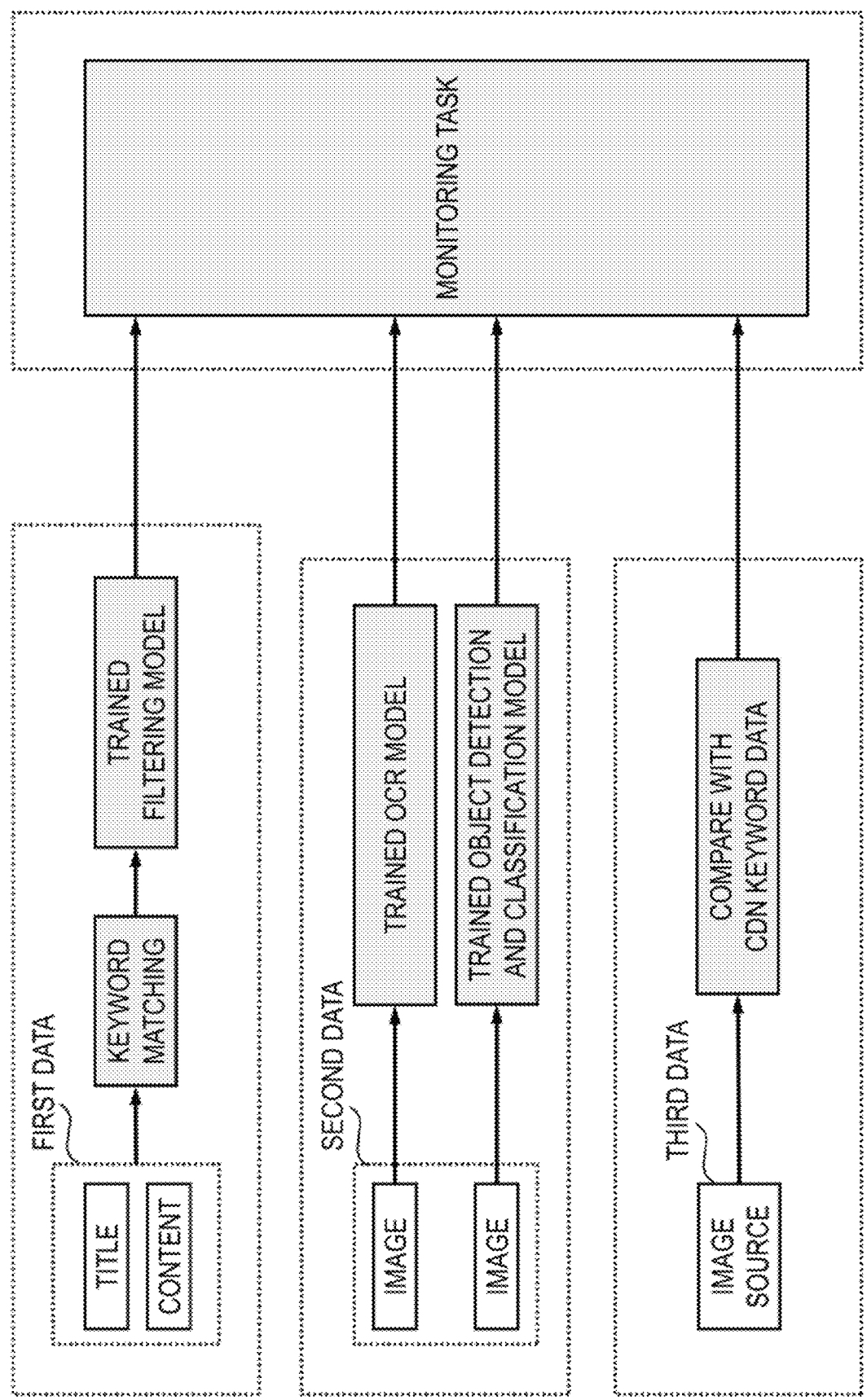
FIG. 5 is a diagram illustrating an aspect of detecting whether the protected object data is included in the crawled data according to the embodiment of the present disclosure.

Meanwhile, in FIGS. 4 and 5, it is described that the trained object detection and classification model performs both the object detection and classification tasks. However, this is only for convenience of description, and it is natural that the object detection model may be implemented to perform the object detection task and the classification model separate from the object detection model may be implemented to perform the classification task.

In the operation S4400 of comparing the third data and the CDN keyword of the protected object data to determine whether the third data includes the characters corresponding to the CDN keyword data of the protected object data, the electronic device 1000 may compare the third data extracted through the operation S3000 and the CDN keyword data included in the protected object data to determine whether the third data includes the characters corresponding to the CDN keyword data of the protected object data.

Figure 6:
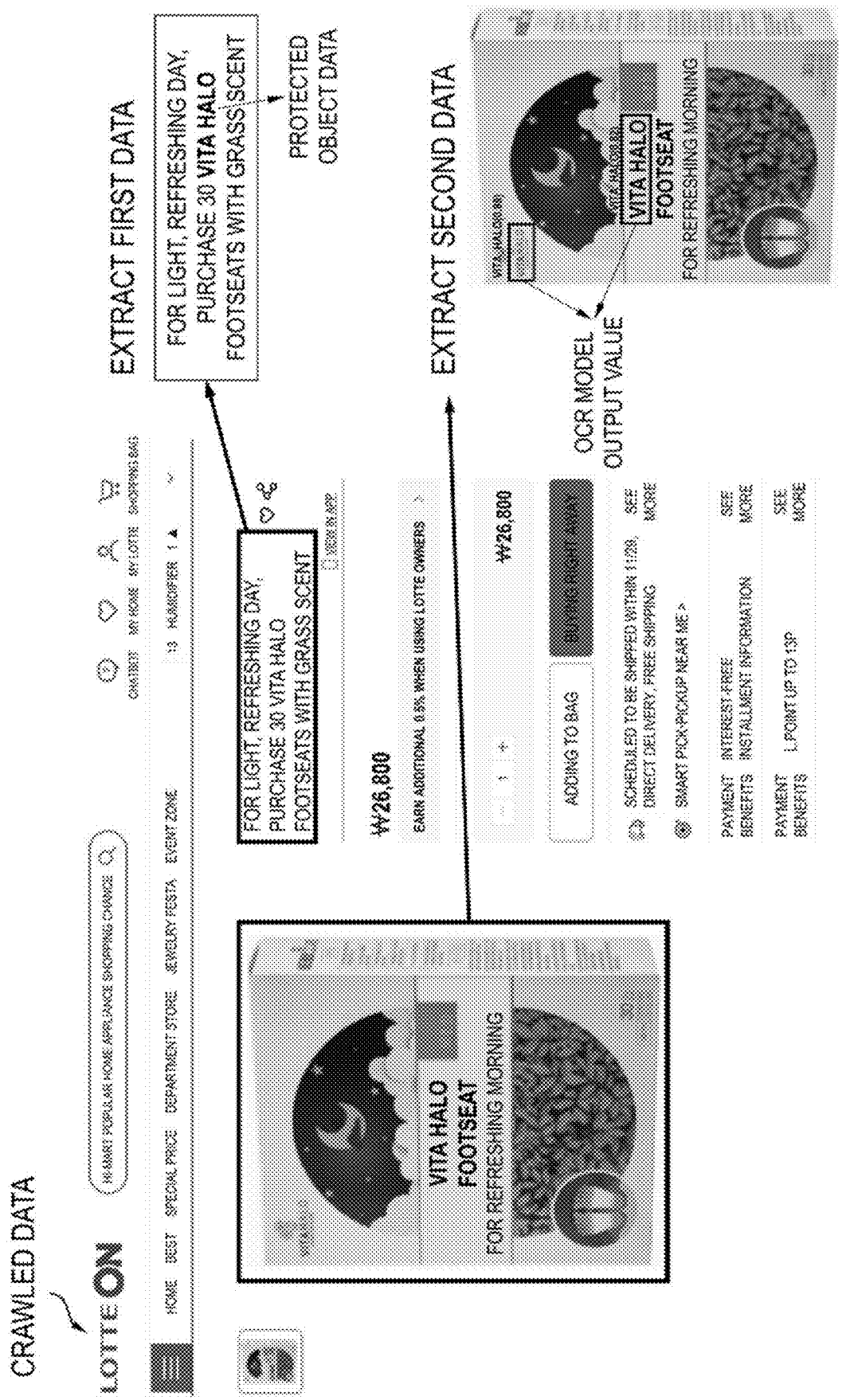
FIG. 6 is a diagram illustrating an example of detecting whether the protected object data is included in the crawled data according to the embodiment of the present disclosure.

FIG. 6 is a diagram illustrating an example of detecting whether the protected object data is included in the crawled data according to the embodiment of the present disclosure.

For example, the electronic device 1000 may parse the crawled data to extract first data corresponding to a title (e.g., "For light, refreshing day, purchase 30 VITA HALO footseats with grass scent" in FIG. 6). Furthermore, the electronic device 1000 may parse the crawled data to extract second data corresponding to an image.

In this case, the electronic device 1000 may determine whether the first data is a character (e.g., "VITA HALO" of the first data in FIG. 6) corresponding to brand character data (e.g., "VITA HALO") of protected object data. Furthermore, the electronic device 1000 may acquire character information (e.g., "VITA HALO" of the second data in FIG. 6) included in the second data using the trained OCR model, and calculate the probability that the character information corresponds to the brand character data of the protected object data by using the trained OCR model. Furthermore, the electronic device 1000 may determine whether the character information corresponds to the brand character data of the protected object data based on the calculated probability. Furthermore, the electronic device 1000 may determine whether there is the brand theft based on the detection result.

Figure 7:
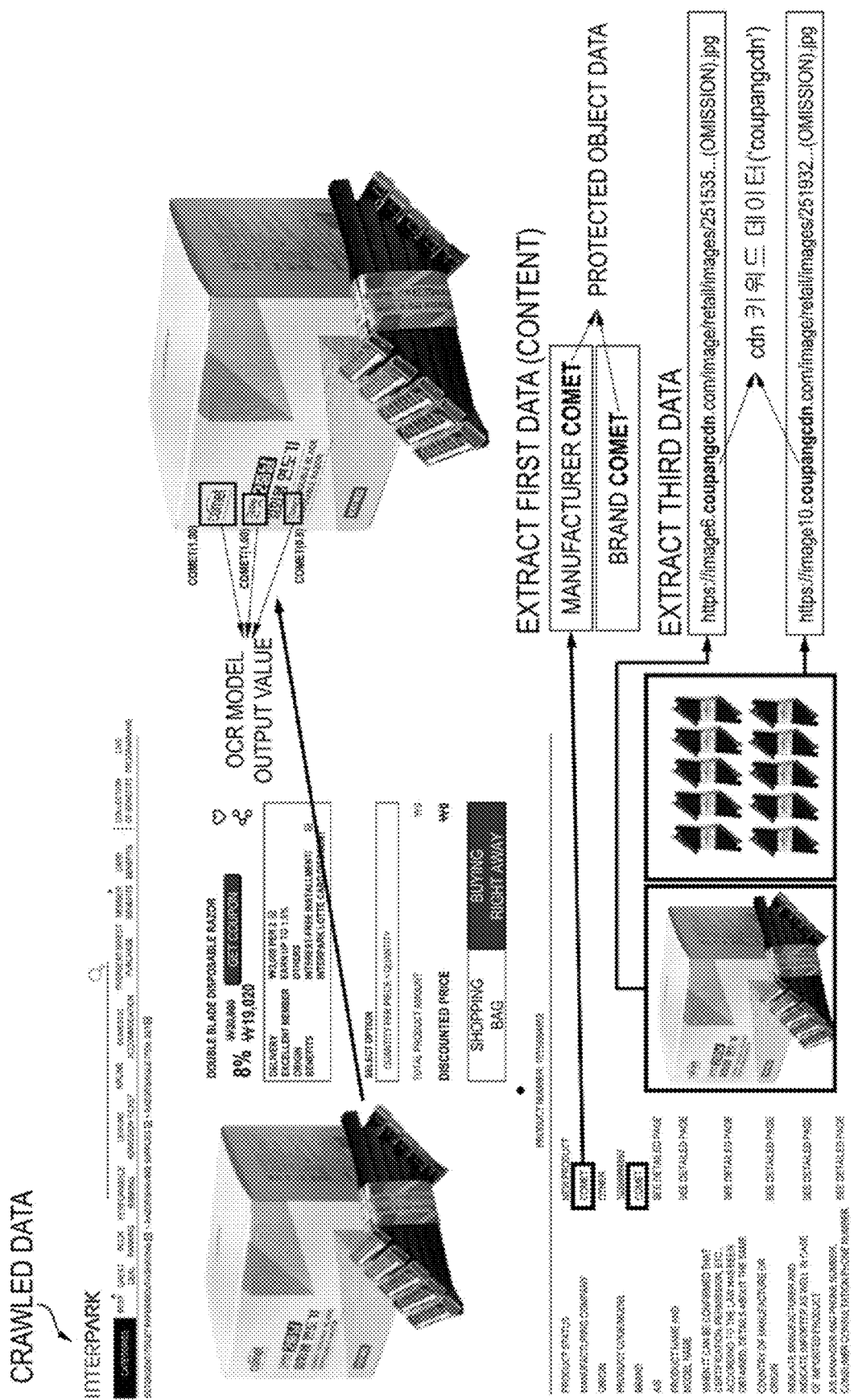
FIG. 7 is a diagram illustrating an example of detecting whether the protected object data is included in the crawled data according to the embodiment of the present disclosure.

FIG. 7 is a diagram illustrating an example of detecting whether the protected object data is included in the crawled data according to the embodiment of the present disclosure.

For example, the electronic device 1000 may parse crawled data to extract first data (e.g., "COMET" in FIG. 7) corresponding to content (e.g., "manufacturer," "brand" in FIG. 7) of a web page. Furthermore, the electronic device 1000 may parse the crawled data to extract second data corresponding to an image. Furthermore, the electronic device 1000 may parse crawled data (e.g., source data of an image of a web page) to extract third data (e.g., "(omission) coupangcdn (omission)" in FIG. 7) related to a source in which the image is stored.

In this case, the electronic device 1000 may determine whether the first data includes a character (e.g., "COMET" of the first data in FIG. 7) corresponding to the brand character data of the protected object data. Furthermore, the electronic device 1000 may acquire character information (e.g., "COMET" of the second data in FIG. 7) included in the second data using the trained OCR model, and calculate the probability that the character information corresponds to the brand character data of the protected object data by using the trained OCR model. Furthermore, the electronic device 1000 may determine whether the character information corresponds to the brand character data of the protected object data based on the calculated probability. Furthermore, the electronic device 1000 may compare the third data and the CDN keyword data (e.g., "coupangcdn") of the protected object data to determine whether the third data includes the characters corresponding to the CDN keyword data of the protected object data. Furthermore, the electronic device 1000 may determine whether there is the brand theft based on the detection result.

Meanwhile, in FIGS. 6 and 7, it is described that the method of detecting a brand theft according to the embodiment of the present disclosure by exemplifying a specific brand and specific data. However, this is only for convenience of description, and should not be construed as being limited to the specific brand and specific data.

Figure 8:
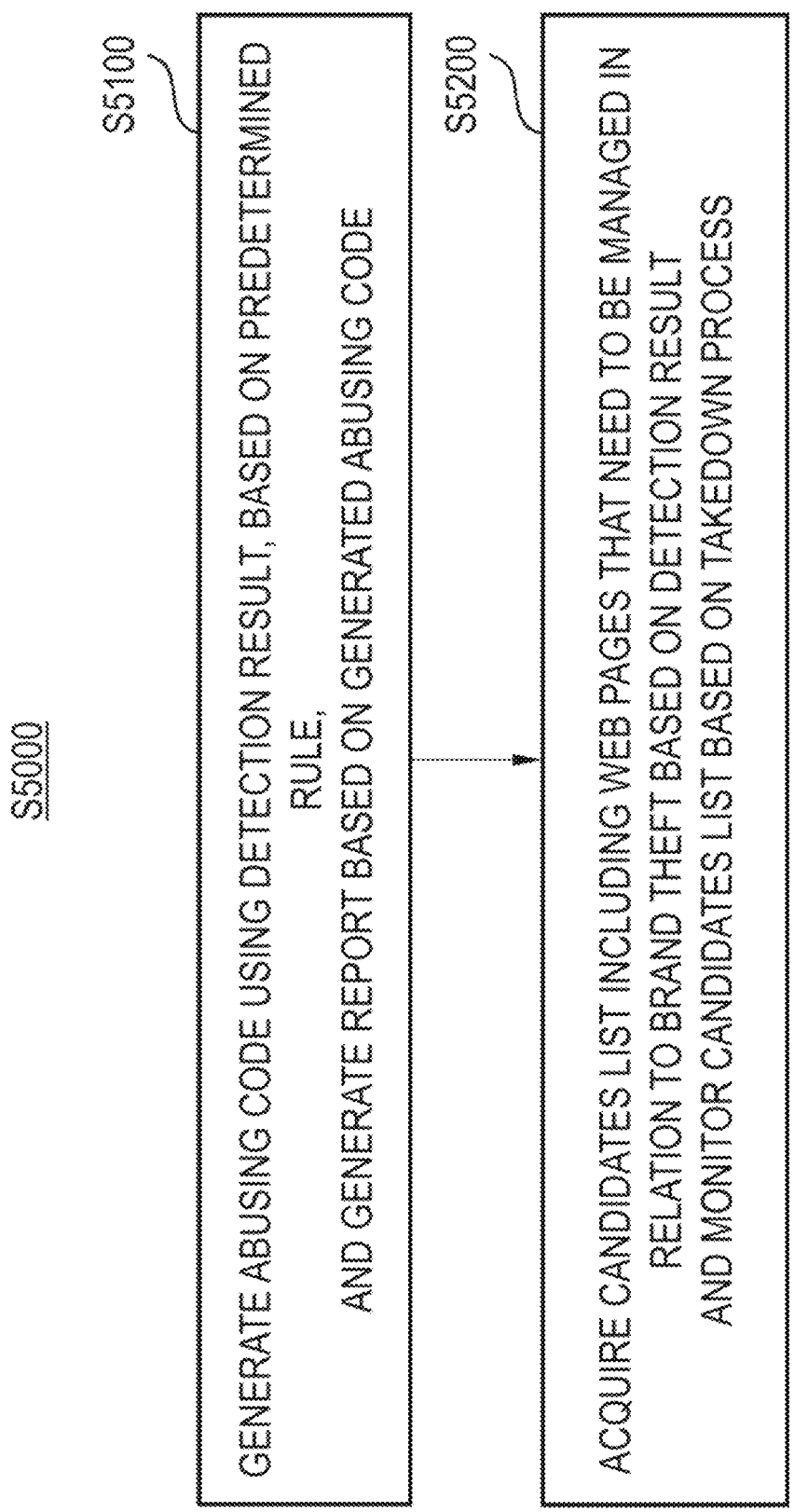
FIG. 8 is a flowchart specifying operations for monitoring web pages according to an embodiment of the present disclosure.

FIG. 8 is a flowchart specifying an operation S5000 of monitoring web pages according to an embodiment of the present disclosure.

The operation S5000 of monitoring web pages based on the detection result according to the embodiment of the present disclosure includes an operation S5100 of generating an abusing code using the detection result based on the predetermined rule and generating a report based on the generated abusing code, and/or an operation S5200 of acquiring a candidates list including web pages that need to be managed in relation to a brand theft based on the detection result and monitoring the candidates list based on the takedown process.

In the operation S5100 of generating the abusing code using the detection result based on the predetermined rule and generating the report based on the generated abusing code, the electronic device 1000 may generate the abusing code related to stolen brand information (e.g., brand name) or legal action using the detection result based on the predetermined rule, and generate the report based on the generated abusing code.

Figure 9:
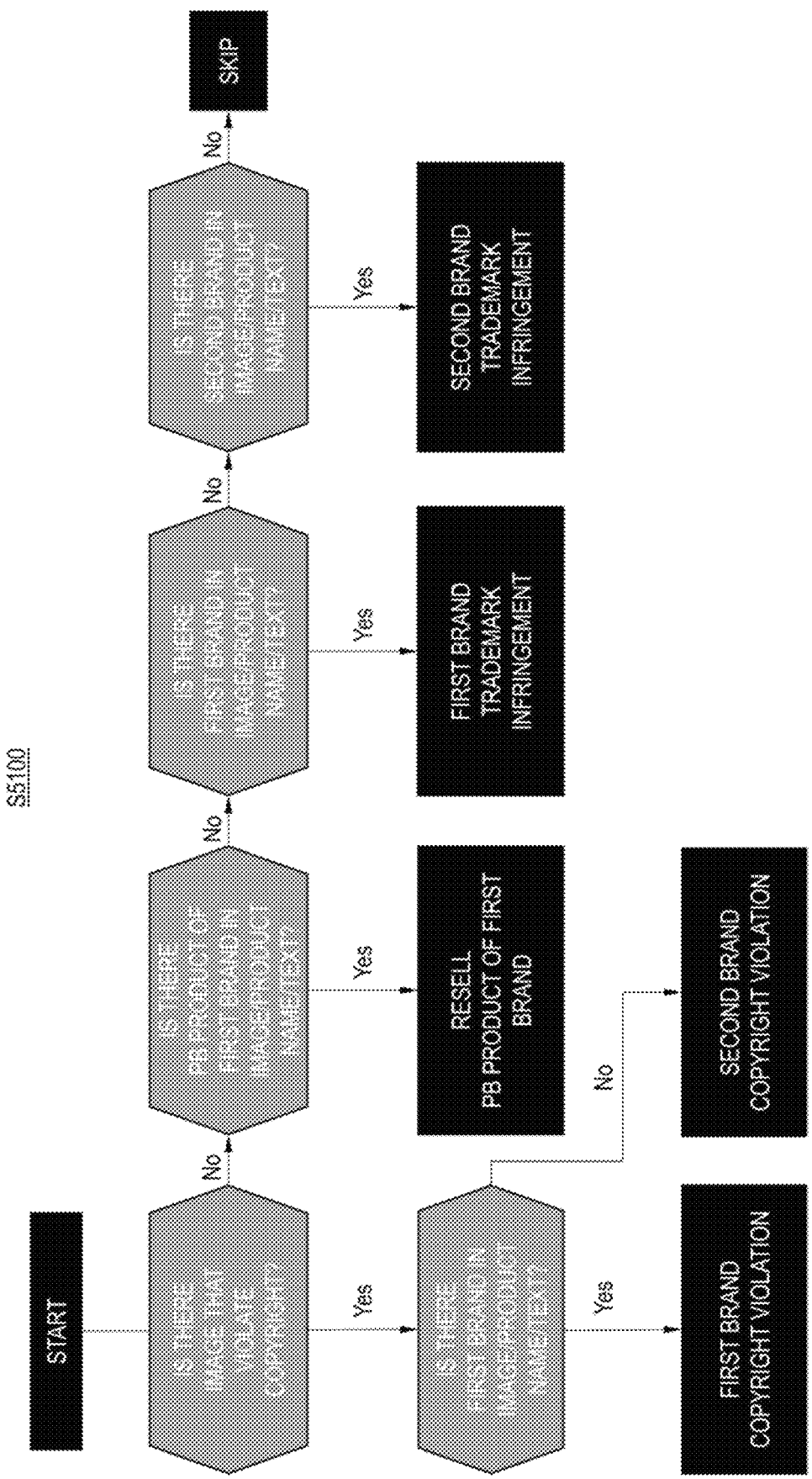
FIG. 9 is an example of a predetermined rule used to generate an abusing code according to an embodiment of the present disclosure.

FIG. 9 is an example of the predetermined rule used to generate the abusing code according to the embodiment of the present disclosure.

As an example, the electronic device 1000 may use the detection result to determine whether there are copyright violation images for a first brand (e.g., CLPB) and a second brand (e.g., COUPANG). In this case, when there is the copyright violation image, the electronic device 1000 may additionally determine whether the first brand (e.g., CLPB) to be protected is present in the image, product name, and/or text on the web page. For example, when the first brand to be protected is present in the image, product name, and/or text on the web page, the electronic device 1000 may be configured to classify a brand theft status of the corresponding web page into a first status code indicating the copyright violation for the first brand. For example, when the first brand (e.g., CLPB) to be protected is not present in the image, product name, and/or text on the web page, the electronic device 1000 may be configured to classify the brand theft status of the corresponding web page into a second status code indicating the copyright violation for the second brand.

As an example, as described above, the electronic device 1000 may use the detection result to determine whether there are the copyright violation images for the first brand (e.g., CLPB) and the second brand (e.g., COUPANG). In this case, when there is no copyright violation image, the electronic device 1000 may use the detection result to additionally determine whether a PB product of the first brand is present in the image, product name, and/or text on the web page. For example, when the PB product of the first brand is present in the image, product name, and/or text on the web page, the electronic device 1000 may be configured to classify the brand theft status of the corresponding web page into a third status code indicating that the PB product of the first brand is being resold. For example, when the PB product of the first brand is not present in the image, product name, and/or text on the web page, the electronic device 1000 may use the detection result to additionally determine whether the first brand is present in the image, product name, and/or text on the web page. In this case, when the first brand to be protected is present in the image, product name, and/or text on the web page, the electronic device 1000 may be configured to classify the brand theft status of the corresponding web page into a fourth status code indicating the trademark infringement for the first brand. Meanwhile, when the first brand is not present in the image, product name, and/or text on the web page, the electronic device 1000 may use the detection result to additionally determine whether the second brand is present in the image, product name, and/or text on the web page. For example, when the second brand is present in the image, product name, and/or text on the web page, the electronic device 1000 may be configured to classify the brand theft status of the corresponding web page into a fifth status code indicating the trademark infringement for the second brand. For example, when the second brand is not present in the image, product name, and/or text on the web page, the electronic device 1000 may be configured to classify the brand theft status of the corresponding web page into a sixth status code (e.g., SKIP) indicating that the brand theft is not detected.

Furthermore, the electronic device 1000 may perform the operation of generating the report based on the status code classified through the operation S5100.

Meanwhile, in FIG. 9, it is described that the electronic device 1000 classifies the abusing code based on a specific example of the predetermined rule. However, this is only an example, and the predetermined rule may be changed into any appropriate form in order to achieve the purpose of efficiently monitoring the web page, and should not be construed as being limited to the predetermined rule illustrated in FIG. 9.

In the operation S5200 of acquiring the candidates list including the web pages that need to be managed in relation to the brand theft based on the detection result and monitoring the candidates list based on the takedown process, the electronic device 1000 may acquire the candidates list including the web pages that need to be managed in relation to the brand theft based on the detection result, and perform the operation of monitoring the candidates list based on the takedown process.

Figure 10:
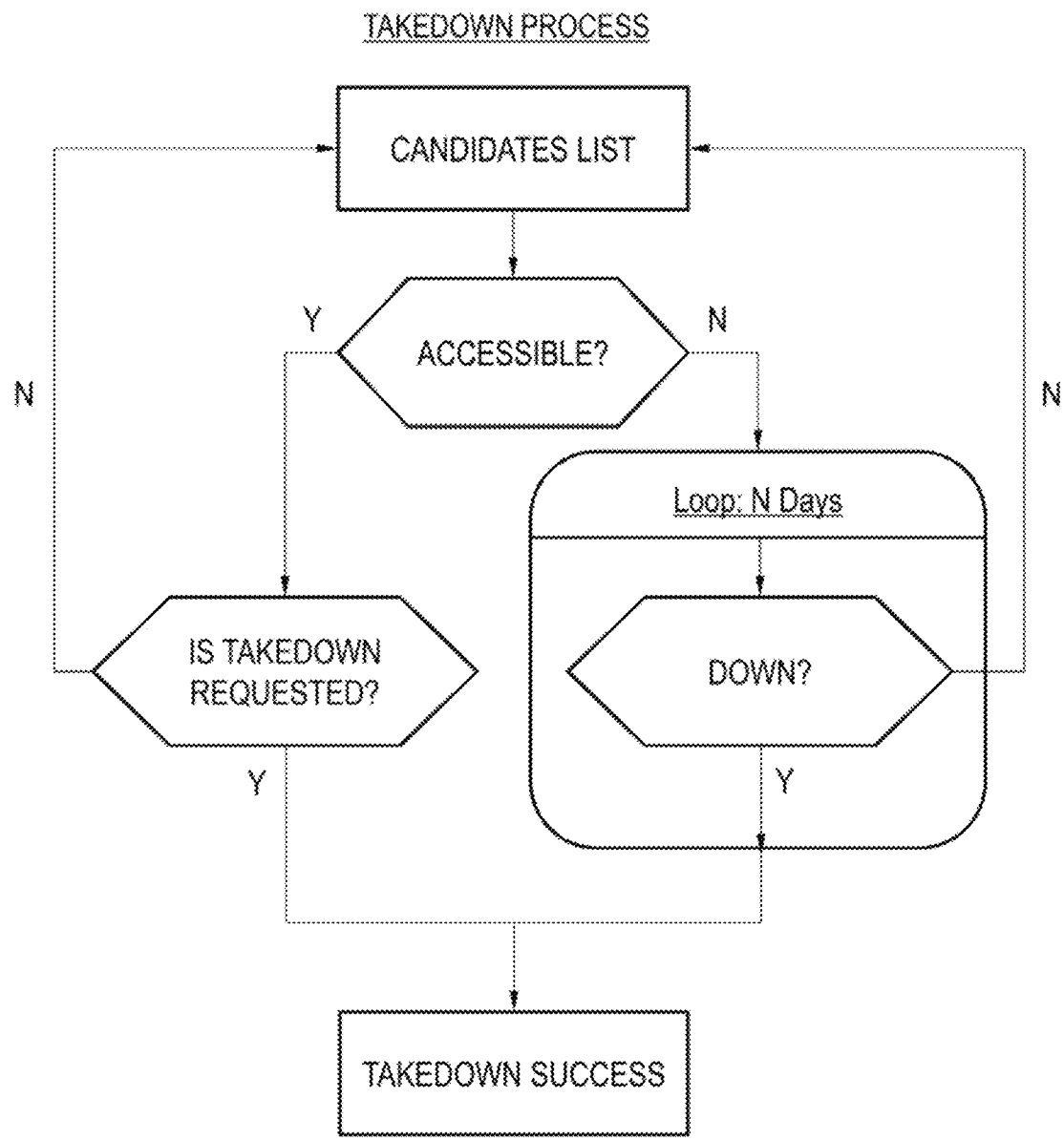
FIG. 10 is a flowchart for describing a takedown process according to an embodiment of the present disclosure.

FIG. 10 is a flowchart for describing the takedown process according to the embodiment of the present disclosure.

Specifically, the electronic device 1000 may acquire the candidates list including the web pages that need to be managed (or monitored) in relation to the brand theft based on the detection result of operation S4000. In this case, the electronic device 1000 may be configured to monitor the web pages included in the candidates list based on the predetermined takedown process.

As an example, the electronic device 1000 may acquire the information on whether the web page included in the candidates list is accessible based on the takedown process. In this case, when the web page included in the candidates list is accessible, the electronic device 1000 may be configured to determine whether there is the takedown request for the web page, and determine that the takedown has been requested when there is the takedown request and exclude the web page from the candidates list. Meanwhile, when there is no takedown request, the electronic device 1000 may be configured to maintain the web page as the candidates list according to the takedown process so as to continuously monitor the corresponding web page.

As an example, as described above, the electronic device 1000 may acquire the information on whether the web page included in the candidates list is accessible based on the takedown process. In this case, when the web page included in the candidates list is not accessed, the electronic device 1000 may be configured to determine whether the web page is accessible for a predetermined period of time (e.g., N days) from the time when the access is not made. In this case, when the web page is not accessed for the predetermined period of time, the electronic device 1000 may be configured to determine that the takedown of the corresponding web page succeeds to exclude the corresponding web page from the candidates list. On the other hand, when the web page is accessed within the predetermined period of time, the electronic device 1000 may be configured to maintain the corresponding web page in the candidates list. By determining whether the web page is accessed for the predetermined period of time, it is possible to continuously monitor the web pages that are temporarily not accessed, rather than due to the takedown request.

Meanwhile, the takedown process illustrated in FIG. 10 is only an example, and in order to achieve the purpose of efficiently monitoring the web pages included in the candidates list, the takedown process may be changed into any appropriate form, and should not be construed as being limited to the illustrated takedown process illustrated in FIG. 10.

According to the method of detecting a brand theft and the electronic device for performing the same according to the embodiment of the present disclosure, by analyzing complex data including characters, images, characters included in the images, and/or data related to the sources in which the images are stored, it is possible to prevent the evasion of the brand theft detection.

According to the method of detecting a brand theft and the electronic device for performing the same according to the embodiment of the present disclosure, by detecting the brand theft using the artificial intelligence model, it is possible to quickly detect the brand theft.

According to the method of detecting a brand theft and the electronic device for performing the same according to the embodiment of the present disclosure, by automatically classifying the brand theft status according to the brand theft detection result, it is possible to save time and money monitoring the brand theft.

According to the method of detecting a brand theft and the electronic device for performing the same according to an embodiment of the present disclosure, by automatically monitoring the takedown of the websites that need to be managed based on the predetermined takedown process, it is possible to automatically monitor the implementation of the e-commerce platform operator.

Various operations of the electronic device 1000 described above may be stored in the memory 1200 of the electronic device 1000, and the processor 1300 of the electronic device 1000 may be provided to perform the operations stored in the memory 1200.

Effects of the present disclosure are not limited to the above-described effects, and effects that are not mentioned will be clearly understood by those skilled in the art to which the present disclosure pertains from the present specification and the accompanying drawings.

Features, structures, effects, etc., described in the above embodiments are included in at least one embodiment of the present disclosure, and are not necessarily limited only to one embodiment. Furthermore, features, structures, effects, etc., illustrated in each embodiment can be practiced by being combined or modified for other embodiments by those of ordinary skill in the art to which the embodiments pertain. Accordingly, the contents related to such combinations and modifications should be interpreted as being included in the scope of the present disclosure.

Although an exemplary embodiment of the present disclosure has been mainly described hereinabove, this is only an example and does not limit the present disclosure. Those skilled in the art to which the present disclosure pertains may understand that several modifications and applications that are not described in the present specification may be made without departing from the spirit of the present disclosure. That is, each component specifically shown in the embodiment may be implemented by modification. In addition, differences associated with these modifications and applications are to be interpreted as being included in the scope of the present specification as defined by the following claims.

What is claimed is:

1. A method of detecting a brand theft, which is performed by an electronic device in e-commerce, the method comprising:
   acquiring protected object data related to a brand to be protected, the protected object data including brand character data representing the brand, brand logo image data related to the brand, and content delivery network (CDN) keyword data indicating a source in which the brand logo image data is stored;
   crawling an e-commerce web page by using a web crawling technique and acquiring crawled data as a result of crawling the e-commerce web page, wherein the crawling of the e-commerce web page comprises crawling the e-commerce web page by using a web crawling tool;
   parsing the crawled data to obtain standardized data from the crawled data, wherein the obtaining of the standardized data comprises acquiring first data corresponding to a title or content of the web page, second data corresponding to an image of the web page, and third data related to a source of the image;
   analyzing each of the first data, the second data, and the third data and detecting whether the protected object data is included in the crawled data for the web page; and
   monitoring e-commerce websites based on a result of the detection,
   wherein the detecting of whether the protected object data is included in the crawled data for the web page includes:
   determining whether the first data includes a character corresponding to the brand character data of the protected object data,
   determining whether character information in the image included in the second data corresponds to the brand character data of the protected object data,
   determining whether the image in the second data corresponds to the brand log image data of the protected object data, and
   comparing the third data with the CDN keyword data of the protected object data to determine whether the third data includes a character corresponding to the CDN keyword data of the protected object data,
   wherein the determining of whether the first data includes the character corresponding to the brand character data of the protected object data includes:
   primarily classifying the first data including the character corresponding to the brand character data of the protected object data through keyword matching between the first data and the brand character data of the protected object data, and
   secondarily classifying whether the classified first data includes the character corresponding to the brand character data of the protected object data from the classified first data through a trained filtering model, and wherein the trained filtering model classifies the character corresponding to the brand character data of the protected object data from the classified first data as a true positive value, and classifies a character literally corresponding to the brand character data of the protected object data from the classified first data as a false positive value.

2. The method of claim 1, wherein the determining of whether the character information included in the image included in the second data corresponds to the brand character data of the protected object data includes:
acquiring the character information included in the image from the image included in the second data through a trained optical character recognition (OCR) model;
calculating a probability that the character information corresponds to the brand character data of the protected object data through the trained OCR model; and
determining whether the character information corresponds to the brand character data of the protected object data based on the calculated probability.

3. The method of claim 1, wherein the determining of whether the image included in the second data corresponds to the brand logo image data of the protected object data includes:
detecting an area corresponding to the image included in the second data through a trained object detection and classification model;
classifying whether an image corresponding to the detected area corresponds to the brand logo image data of the protected object data through the trained object detection and classification model; and
determining whether the image included in the second data corresponds to the brand logo image data of the protected object data based on a result of the classification.

4. The method of claim 1, wherein the monitoring of the e-commerce websites based on the result of the detection includes:
generating an abusing code related to a stolen brand name or legal action using the result of the detection based on a predetermined rule; and
generating a report based on the generated abusing code.

5. The method of claim 1, wherein the monitoring of the e-commerce websites based on the result of the detection includes:
acquiring a candidates list including web pages that need to be managed in relation to the brand theft based on the result of the detection; and
monitoring the candidates list based on a takedown process.

6. The method of claim 5, wherein the takedown process determines whether there is a takedown request for the web page when the web page included in the candidates list is accessible, determines that the takedown succeeds when there is a takedown request to exclude the web page from the candidates list, and maintains the web page in the candidates list when there is no takedown request.

7. The method of claim 5, wherein, when the web page included in the candidates list is not accessed, the takedown process determines whether the web page is accessible for a predetermined period of time from the time when the access is not made, and when the web page is not accessed for the predetermined period of time, the takedown process determines that the takedown of the web page succeeds to exclude the web page from the candidates list.

8. A non-transitory computer-readable recording medium including instructions that allow a computer to execute the method according to claim 1.

9. An electronic device for detecting a brand theft, the electronic device comprising:
a memory storing instructions; and
a processor configured to execute the instructions to:
acquire protected object data related to a brand to be protected, the protected object data including brand character data representing the brand, brand logo image data related to the brand, and content delivery network (CDN) keyword data indicating a source in which the brand logo image data is stored,
crawl an e-commerce web page by using a web crawling technique and acquire crawled data as a result of crawling the e-commerce web page, wherein the crawling of the e-commerce web page comprises crawling the e-commerce web page by using a web crawling tool,
parse the crawled data to obtain standardized data from the crawled data, wherein the obtaining of the standardized data comprises acquiring first data corresponding to a title or content of the web page, second data corresponding to an image of the web page, and third data related to a source of the image,
analyze each of the first data, the second data, and the third data to detect whether the protected object data is included in the crawled data for the web page, and
monitor e-commerce websites based on a result of the detection,
wherein the detecting of whether the protected object data is included in the crawled data for the web page includes:
determining whether the first data includes a character corresponding to the brand character data of the protected object data,
determining whether character information in the image included in the second data corresponds to the brand character data of the protected object data,
determining whether the image in the second data corresponds to the brand log image data of the protected object data, and
comparing the third data with the CDN keyword data of the protected object data to determine whether the third data includes a character corresponding to the CDN keyword data of the protected object data,
wherein the determining of whether the first data includes the character corresponding to the brand character data of the protected object data includes:
primarily classifying the first data including the character corresponding to the brand character data of the protected object data through keyword matching between the first data and the brand character data of the protected object data, and
secondarily classifying whether the classified first data includes the character corresponding to the brand character data of the protected object data from the classified first data through a trained filtering model, and
wherein the trained filtering model classifies the character corresponding to the brand character data of the protected object data from the classified first data as a true positive value, and classifies a character literally corresponding to the brand character data of the protected object data from the classified first data as a false positive value.

* * * * *